(12) United States Patent
Shamir et al.

(10) Patent No.: US 7,496,293 B2
(45) Date of Patent: Feb. 24, 2009

(54) VERSATILE CAMERA FOR VARIOUS VISIBILITY CONDITIONS

(75) Inventors: Hanan Shamir, Haifa (IL); Yossi Yaeli, Haifa (IL)

(73) Assignee: Elbit Systems Ltd., Haifa (IL)

(*) Notice: Subject to any disclaimer, the term of this patent is extended or adjusted under 35 U.S.C. 154(b) by 564 days.

(21) Appl. No.: 11/182,302

(22) Filed: Jul. 15, 2005

(65) Prior Publication Data

US 2006/0291849 A1    Dec. 28, 2006

Related U.S. Application Data

(63) Continuation-in-part of application No. PCT/IL2004/000038, filed on Jan. 14, 2004.

(51) Int. Cl.
  *G03B 41/00* (2006.01)
(52) U.S. Cl. .............. 396/333; 348/216; 348/262; 348/342
(58) Field of Classification Search .......... 396/333, 396/334; 348/216.1, 218.1, 262, 342
See application file for complete search history.

(56) References Cited

U.S. PATENT DOCUMENTS

| | | | |
|---|---|---|---|
| 5,132,802 A * | 7/1992 | Osthues et al. .......... 348/262 |
| 5,742,264 A * | 4/1998 | Inagaki et al. .......... 345/8 |
| 6,215,597 B1 | 4/2001 | Duncan et al. | |
| 6,246,437 B1 | 6/2001 | Kaneda | |
| 6,292,215 B1 * | 9/2001 | Vincent .......... 348/169 |
| 7,015,944 B2 * | 3/2006 | Holz et al. .......... 348/148 |
| 2003/0048493 A1 | 3/2003 | Pontifex et al. | |

FOREIGN PATENT DOCUMENTS

| EP | 1 158 787 A | 11/2001 |
|---|---|---|
| WO | WO 90/05426 A | 5/1990 |

OTHER PUBLICATIONS

Waxman A. M. et al., "Electronic Imaging Aids For Night Driving: Low-Light CCD, Uncooled Thermal IR, and Color Fused Visible/LWIR" Proceedings of the SPIE, SPIE Bellingham, VA, US, vol. 2902, Nov. 18, 1996, pp. 62-73, XP008015964, ISSN: 0277-786X, p. 64, line 17-line 26; figure 4.
International Search Report for PCT/IL2004/000038: Form PCT/ISA/210 (4 pages).
International Preliminary Report on Patentability for PCT/IL2004/000038: Form PCT/IPEA/409 (15 pages).

* cited by examiner

*Primary Examiner*—Christopher Mahoney
(74) *Attorney, Agent, or Firm*—Edwards Angell Palmer & Dodge, LLP

(57) ABSTRACT

A versatile camera that operates in various visibility conditions, such as daylight and poor visibility conditions, the camera including at least two sensors that capture images in a scene and provide a digital representation of the captured images, each sensor having a particular operational wavelength, and an optical and routing module that receives incoming rays from the scene and routes the incoming rays toward the two sensors.

44 Claims, 8 Drawing Sheets

VERSATILE CAMERA FOR VARIOUS VISIBILITY CONDITIONS

CROSS REFERENCE TO RELATED APPLICATION

This application is a continuation-in-part of international application number PCT/IL2004/000038 (publication number WO 2004/064391), filed Jan. 14, 2004, which claims the benefit of Israel application number 153967, filed Jan. 15, 2003, the disclosure of which is incorporated herein by reference in its entirety.

FIELD OF THE DISCLOSED TECHNIQUE

The disclosed technique relates to 24 hour remote vision in general, and more particularly to methods and systems for improving the remote vision by reproducing the field of view under various visibility conditions. The disclosed technique is particularly applicable to real time displays of a direct scene, such as on a helmet visor, vision goggles or other eyepieces.

BACKGROUND OF THE DISCLOSED TECHNIQUE

Various visibility conditions typify many applications requiring deployment of a camera for remote vision. Such a camera is often a video camera that continuously provides images of a scene. The camera is often required to operate around the clock—during day and night, and under changing weather conditions. The camera may be stationary. In many cases the camera is portable or carried by a vehicle, for terrestrial or airborne tasks, and as such can be exposed to unpredictable or rapidly changing visibility circumstances. A good example is a camera employed for Head Mounted Display ("HMD"). HMD concerns a helmet or goggles or monocle wearer, within or outside a vehicle, whether for military or civilian purposes. HMD prevalently features image projection reflected from monocle or goggles lenses or a helmet visor to the eyes of the wearer in registration with the direct scene as seen by the wearer through the visor or the goggles. HMD users can include a pilot or another airplane crew member, a vehicle operator (in space, air, sea, or land), an arms operator, a foot soldier, and the like. For the sake of simplicity, reference below shall be frequently made to the example of a helmet visor and a pilot, whereby it is noted that the principles concerned are well applicable to other devices and methods with analogous implications.

In airplane cockpits, Heads Up Display ("HUD") is giving way to HMD. The image often includes a vision enhancement display, wherein the field of view as seen by the user through the visor, namely a direct scene, is combined with an image of the same view made to reflect from the visor. The combination is conducted in registration, namely—the projected image of the field of view converges, in real time, with that of the actual direct scene view as seen by the user through the visor. The projected image is captured by a camera, and is manipulated by image processing means available onboard (often on the helmet). If necessary, with the aid of positioning means, the system can calculate in real time the user's head (such as the pilot's helmet) position and view orientation, and provide the image compatible to the user's field of view. If the camera is mounted on the helmet or attached to the user's head or on a suitable headset or goggles, the burden of calculating the relative fields of view of the user and the camera can be relieved or spared entirely, as the camera can be aligned to face the field of view of the user. The installment of a camera on a helmet or another eyepiece support calls for miniaturization of the camera in size and weight as much as possible, so as to eliminate interference to the user. A compact camera has limited room and poses a difficulty for containing space-consuming features, such as night vision enhancement, spectral conversion and high quality broad spectrum perception. The use of a single sensor for various wavebands, such as visible spectrum (for daylight vision), NIR (for night vision), or infrared (such as for thermal detection), imposes a difficult task for the sensor to achieve. A single sensor cannot adapt simultaneously for optimal detection of different wavelength ranges and/or wide range of illumination levels without limiting resolution and refresh rates. The use of separate cameras, one for each waveband or illumination level, incurs the addition of excess weight when several cameras are used simultaneously. Alternatively, repeated switching between different cameras is cumbersome, and increases the manufacturing and maintenance costs.

SUMMARY OF THE DISCLOSED TECHNIQUE

It is an object of the disclosed technique to provide a novel method and camera for various visibility conditions, that allows for concurrently containing at least two vision sensing features, such as daylight vision, dim light or night vision enhancement, spectral conversion, high quality broadband perception, and the like. Spectral conversion can refer to capturing the view in non-visible bands, such as ultraviolet (UV), near infrared (NIR) and thermal infrared (IR). IR is detected by the Forward Looking Infra Red (FLIR) technique, either at the higher frequencies (such as for active IR) or lower frequencies (such as for thermal detection). Mere enhancement of direct scene daylight is redundant, but can be beneficial for providing an indirect scene daylight image, or accentuation of certain objects only, such as the pointing spots of laser designators or the "coloring" of objects for identification purposes (friend or foe, preplanned target, terrestrial navigational marks, and the like). Dim light and night vision involve image intensification. FLIR vision involves the conversion of detected IR wavelengths into a visible display.

The disclosed technique overcomes the disadvantages of the prior art by providing a stationary, portable, handheld, or head mounted camera for capturing and conveying a direct or indirect scene, while routing the incoming light to at least two sensors, wherein each sensor is optimally designed for a particular waveband. In accordance with the disclosed technique, there is thus provided a versatile camera for various visibility conditions, having an optical and routing module and at least two sensors. The optical and routing module serves to receive incoming rays from the scene and route these rays to at least two sensors, respectively. The at least two sensors serve to capture images of the scene and provide a digital signal representation of the images, wherein each sensor has particular operational wavelength range or ranges. According to one aspect of the disclosed technique, at least one of the at least two sensors incorporates a poor visibility conditions sensor, such as a dim light features amplifier or an invisible light sensor for detecting invisible light and its conversion to a visible representation. Preferably, at least another one of the at least two sensors is a daylight sensor, thus providing seamless capabilities for day and night or for good and poor visibility conditions. The images retrieved by the sensors are forwarded to the head mounted display, or initially processed and merged in registration.

According to the disclosed technique there is also provided a method for providing images of a scene under various visibility conditions for a display, by which incoming rays are received from the scene and routed to at least two sensors. Each sensor has a particular operational wavelength range. Preferably, at least one of the at least two sensors is a poor visibility conditions sensor, providing for instance the amplification of dim light, or conversion of invisible light to a visible representation. Preferably, at least another one of the at least two sensors is a daylight sensor, thus providing seamless day and night (24 hour) capabilities. The images are then forwarded to the display or merged in registration and processed and the resultant image is then provided to the head mounted display.

BRIEF DESCRIPTION OF THE DRAWINGS

The disclosed technique will be understood and appreciated more fully from the following detailed description taken in conjunction with the drawings in which.

DETAILED DESCRIPTION OF THE PREFERRED EMBODIMENTS

Figure 1:
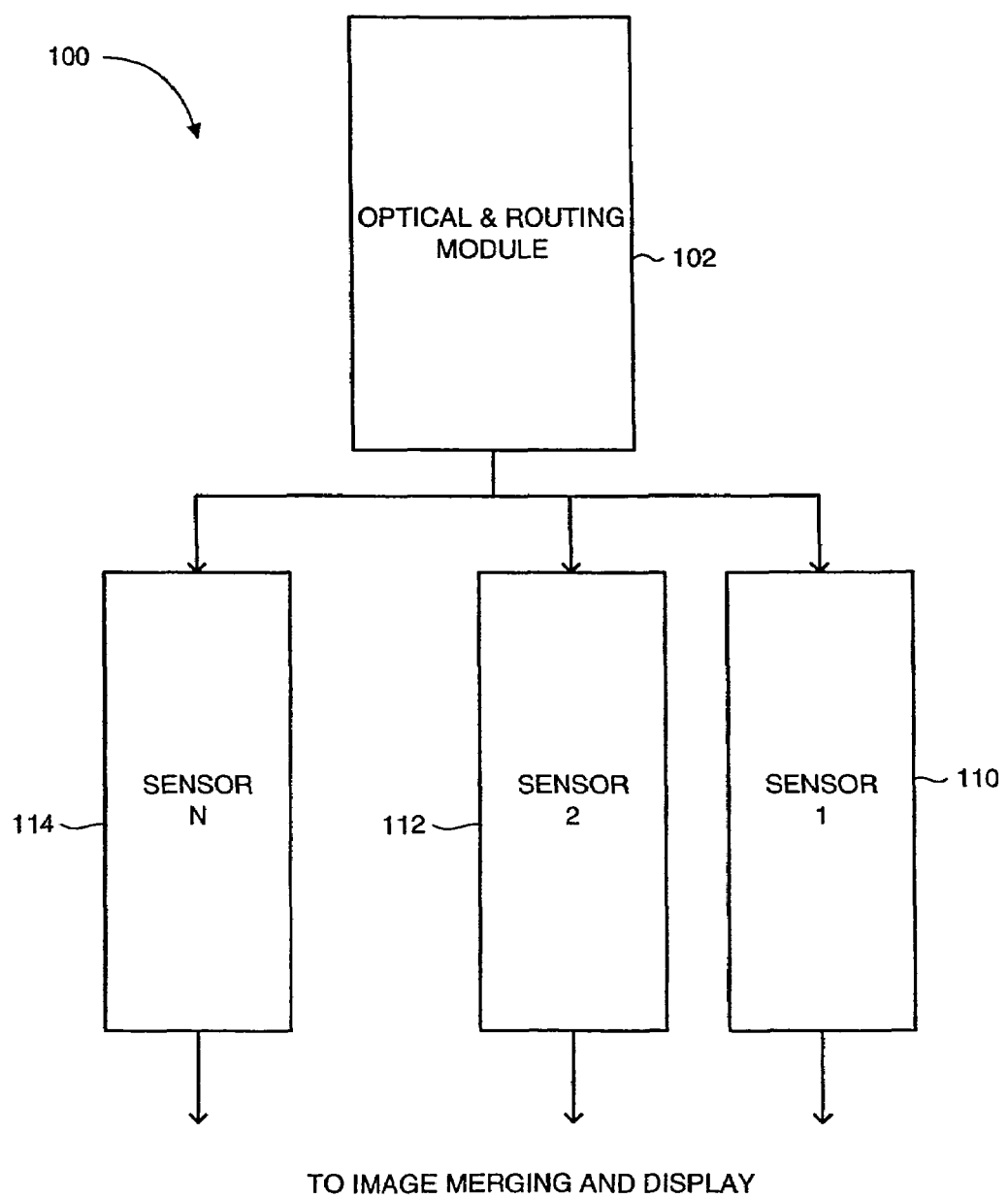
FIG. 1 is a schematic illustration of a camera constructed and operative in accordance with one embodiment of the disclosed technique.

Reference is now made to FIG. 1, which is a schematic illustration of a camera, generally referenced 100, constructed and operative in accordance with an embodiment of the disclosed technique. Camera 100 includes an optical and routing module 102 and "N" sensors 110, 112, and 114. N can be any natural number greater than one, as camera 100 comprises at least two sensors. Optical and routing module 102 includes optical elements for capturing images and a router for routing the captured images to different channels. The optical elements and the router can be integral or separate elements. Optical and routing module 102 is coupled with sensors 110, 112, and 114. Incoming rays from a scene are perceived by optical and routing module 102 and forwarded to sensors 110, 112, and 114. The scene can be a direct scene—conforming to the view of a real time spectator; or an indirect scene—which is not viewed simultaneously by a direct spectator. The light detected by each of sensors 110, 112, and 114 is converted to a digital signal representation of the images of the captured scene, usually by pixel values of a raster pattern. The image signal is fed downstream for further processing to a display or to an intermediate image processor that merges the images in registration into a single image. Each of sensors 110, 112, and 114 has a particular operational wavelength range (or set of ranges) that suits for detection in a particular operational domain. The range(s) of each of sensors 110, 112, and 114 can be distinct, but can also overlap, at least partially, with spectral range(s) of other sensors thereof. Preferably, at least one of sensors 110, 112, and 114 is a poor visibility conditions sensor, i.e.: a sensor that facilitates perception of the viewed scenery despite the poor visibility circumstances. The poor visibility conditions sensor should feature high sensitivity and low resolution, thereby facilitating perception of the viewed scenery despite the poor visibility conditions, where scarce light is received from the scenery. A poor visibility conditions sensor features, for example, the amplification of dim light, or the detection and conversion of invisible light to a visible representation. It is noted that both amplification and conversion capabilities often exist in a single sensor. Further preferably, at least one of sensors 110, 112, and 114 is a daylight sensor. The daylight or good visibility conditions sensor should feature low sensitivity and high resolution, which can provide a high resolution image under good visibility conditions, where ample light is received from the scenery. By selecting at least one of sensors 110, 112, and 114 to be a daylight sensor, and selecting at least another one of sensors 110, 112, and 114 to be a poor visibility conditions sensor, camera 100 acquires seamless day and night (24 hour) capabilities, or seamless good visibility and poor visibility, capabilities.

Optical & routing module 102 includes optical elements such as lenses that provide for the capturing of the general view, focusing at a range that matches the view as seen by the user (typically infinite range). For example a viewing angle of about 50 degrees focused at infinite range satisfactorily covers the entire field of view of a pilot wearing a HMD device on a helmet. The optical elements may be either shared among all of sensors 110, 112 and 114, or associated separately with each sensor. The calibration of camera 100 with the line-of-sight of the HMD wearer can be predetermined by the helmet headset or display device manufacturer, but can also provide for personal calibration, either once or before each operation, if necessary. A stationary or hand held camera further requires calibration between the user's line-of-sight and the camera. Such a task is achievable by position and orientation sensors coupled with the user's head, along with suitable control and processing means that either continuously direct the camera toward the user's line-of-sight with adequate physical orientation means coupled with the camera, or retrieve (by appropriate algorithms) the image view angle that corresponds to the user's line-of-sight.

The user's line-of-sight detection can be employed for spatial and temporal stabilization of camera 100 or of the image output of camera 100. A user's line-of-sight detector can refer to a fairly accurate head line-of-sight reader or to a more precise eye line-of-sight tracker. Spatial and temporal filtering at the pixel level is subsequently conducted with reference to the readings of the user's line-of-sight detector Optical and routing module 102 routes the incoming rays toward sensors 110, 112, and 114, respectively. The router can be installed along the path of the incoming rays downstream of the optical elements and upstream of sensors 110, 112, and 114. The router can form an integral part of the optical elements in optical and routing module 102 or it can be installed within the optical elements of optical and routing module 102. An example for the latter includes disposing diffractive lenses among the optical elements of optical and routing module 102, or the disposing of integrated parallel optical routes along the optical path. The operation of the router may be based on aperture division (including different apertures) or wavefront division (based on wavelength or a fixed percentage), or a combination thereof. The router can also be disposed upstream of the optical elements and produce different light beams that pass through optical and routing module 102 in different paths toward their corresponding different sensors. Optional elements that can function as a beam splitter element can rely for instance on intensity allocation or wavelength "segregation". Such beam splitters include, for example, a slanted semi-transparent partially reflecting mirror, a prism, a pellicle, and a spectral splitter, wherein each wave band is reflected or refracted in a different direction toward a compatible sensor. Other examples for beam splitter include lenses, diffractive element, micro machining (mechanically deflecting plates—MEMS/MOEMS), bifocal optics (such as two parallel optical barrels), multiple path optics, and the like. The splitter can comprise a small-portion/large-portion splitter, wherein a small-portion of the light intensity is directed toward a daylight sensor and a large-portion of the light intensity is directed toward a poor visibility conditions sensor. The term 'large-portion' refers to an amount of light which is substantially greater than the 'small portion', for example, approximately an order of magnitude. Such a splitter can include, for example, a "10%-90%" prism, wherein 10% of the light intensity is reflected to a daylight sensor and 90% is refracted toward a night vision sensor. Daylight is a naturally strong light, and thus 10% can suffice for sensor detection while most of the weak night light is required for detection. An alternative splitter can include a 10%-90% pellicle (such as a thin membrane stretched on a ring), wherein 90% of the light intensity is reflected to a night vision sensor and 10% is refracted toward a daylight sensor.

In some embodiments, the wavelength sensitivity ranges of the daylight sensor (also known as the good visibility conditions sensor) and the poor visibility conditions sensor overlap at least in part, and different (e.g., small or large) portions of the light intensity are directed to each sensor. In some embodiments, when the wavelength of the incoming light rays falls within a non-overlapping part of the ranges, the optical and routing module directs these rays to the daylight (good visibility conditions) sensor, or the poor visibility conditions sensor, or both. The non-overlapping part of the ranges can be within the range of the daylight (good visibility conditions) sensor, or the poor visibility conditions sensor, or both.

For various visibility conditions, sensors 120, 122, or 124, may include a visible light sensor, a night vision enhancement sensor, a forward looking infra-red (FLIR) sensor, and the like.

Suitable FLIR vision sensors may include an InGaA (Indium Gallium Arsenide) based sensor for the short wave infrared range; an InSb (Indium Stibnite) based sensor for the mid wave infrared range; or a non-refrigerated VOx (Vanadium Oxide) micro bolometer, a GaA (Gallium Arsenide) based sensor, or a QWIP (Quantum Well Infrared Photodetector) for the long wave infrared range. In the context of an aircraft, FLIR vision may not be functional with optical elements that are opaque to thermal detection frequencies applicable for FLIR, namely—3 to 5 microns (3000-5000 nm). Materials such as ZnS (Wurtzite, Zinc Blende or Sphalerite also known as "cleartrun" or "cleartrans") with broadband permeability including the FLIR operational range, can be employed in this context for the camera optical elements in the optical and routing module 102. With common cockpit canopies being substantially opaque to the FLIR operational ranges, the FLIR-embodying camera can be mounted externally on the airplane body.

A visible light sensor is either a black and white or color sensor, preferably an Active Pixel System (APS) operational, for instance, in the 400 to 680 nm (or the narrower 450 to 650 nm) visible band. The APS can be of a "rolling row" type or a "global shutter" type. The rolling row APS scans the pixels row after row in a raster and incurs a non-uniform integration signal. The global shutter APS provides for whole pixels array exposure at the same "instant"—during a short integration time period.

According to a particular aspect of the disclosed technique, at least one sensor is operational at the non-visible, 1064 nm IR frequency, which corresponds to a prevalent laser designating frequency known as LIDAR (Laser Intensity Direction And Ranging) application. In some cases a visible light sensor can also include this IR vision capability. The detection of the 1064 nm frequency provides for the user indication of the physical spot on the laser-designated objects in real time. Such detection can be conducted during the day as well as the night. The 1064 nm frequency is not detected by regular daytime and nighttime sensors. If the 1064 nm radiation is concealed by the strong daylight radiation, its daylight sensor can remain operative during the night in parallel to a night vision sensor and provide additional image information. This frequency, as well as other frequencies can by employed for emphasizing laser-designated objects, identification of modulated or encrypted transmission by a laser, and the like.

If a laser or another active source is employed to shed light at this frequency by covering or scanning a large area, the additional detected frequency can add a contrast effect to the overall image detected by the other "regular" frequencies. In the military context, if detection of this frequency is beyond the range of day and IR detectors, an active source is not likely to be detected by a foe. The APS for that purpose can also include a "high pass" IR sensor, operational at wavelengths above 950 nm. Alternatively, an APS for that purpose can include a broadband sensor operational from 400 nm to 1100 nm, covering daylight, while a filter that blocks the undesired wavelengths can be implemented in conjunction with the optical and routing module 102.

Camera 100 can be operative to apply to both eyes of the user, wherein the image is divided for its separate application to each eye. In the example of HMD with a helmet, preferably, only one camera 100 is mounted on the helmet, to minimize weight and costs. In order to reach both eyes of the helmet wearer, where applicable, camera 100 can be operative to apply to both eyes of the user, wherein the image output of camera 100 is divided for its separate application to each eye of the user. The division can take place with a suitable processor (such as control and processing unit 250 of FIG. 2) or in further elements on the helmet display features or on board. Alternatively, camera 100 is operative to apply to a single eye of the user. Further alternatively, a second camera similar to camera 100 is operative to apply to the other eye of the user. It may be desirable to provide a separate camera for each eye of the user, such as when stereoscopic vision is of substantial significance.

Camera 100 can be stationary, hand held, or mounted on, integral with, added on, or attachable to a device worn by the user, such as a head mounted display (HMD), a helmet, a headset, goggles, eyepiece, binoculars and a monocle. Camera 100 can be designed for use in an air, space, sea, or land environment, onboard a vehicle or for portable use by an individual outside a vehicle.

Figure 2:
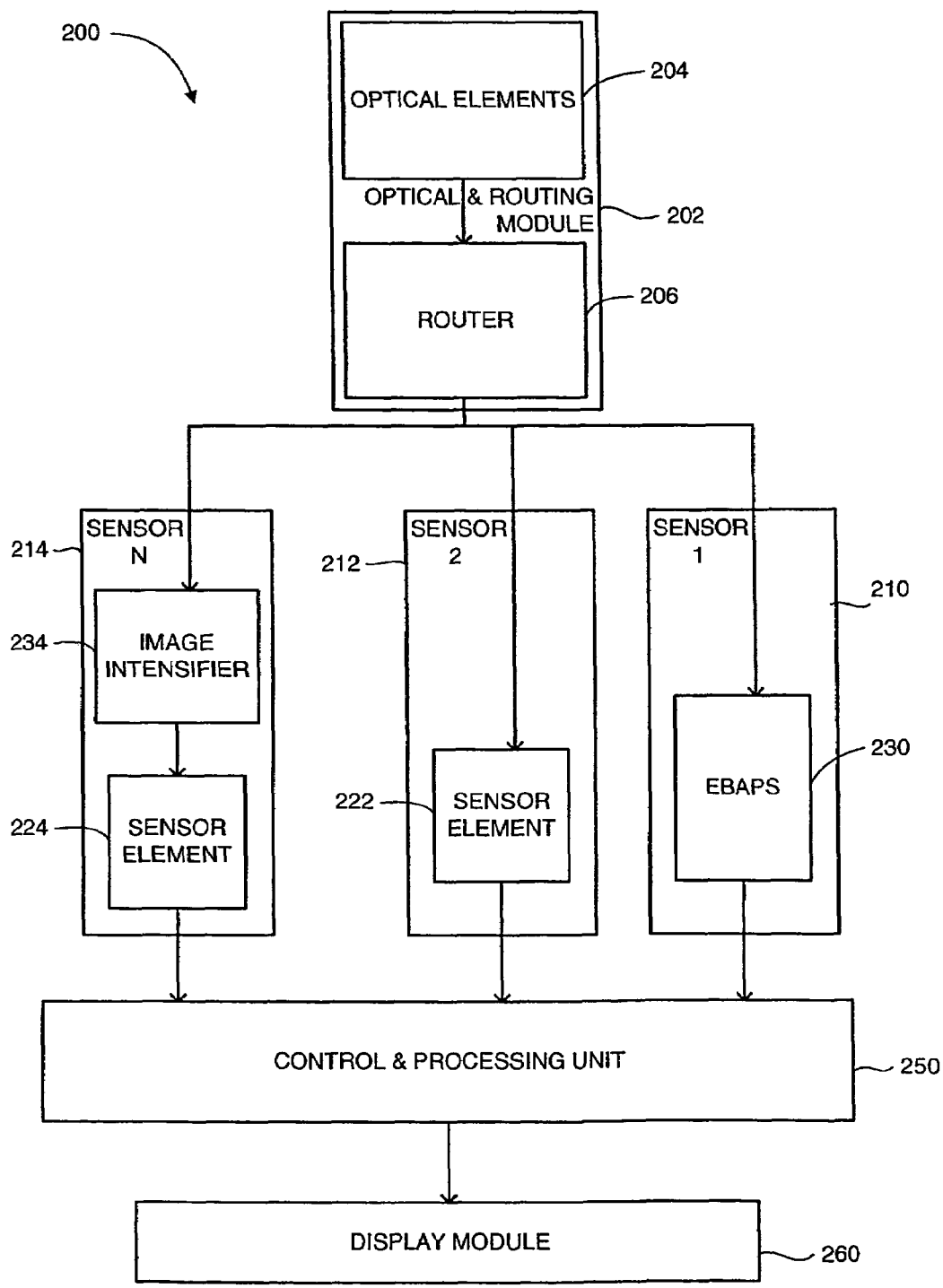
FIG. 2 is a schematic illustration of a camera constructed and operative in accordance with another embodiment of the disclosed technique.

Reference is now made to FIG. 2, which is a schematic illustration of a camera, generally referenced 200, constructed and operative in accordance with another embodiment of the disclosed technique. The embodiment shown in FIG. 2 has similarities to the one shown in FIG. 1, with like parts designated by like numerals except for the use of a prefix 200 instead of 100, and their functioning is analogous and thus not elaborated. Camera 200 includes optical and routing module 202, sensors 210, 212, and 214, control and processing unit 250, and display module 260.

Optical and routing module 202 includes optical elements 204 and router 206. In this example, light is initially encountered by optical elements 204. Subsequently, the light beam is forwarded to router 206. Router 206 selectively routes the light beam on a frequency domain basis toward the relevant sensors 210, 212, and 214.

A dim light or night vision enhancement sensor usually requires light enhancement for intensifying the weak dim or night light. A sensor for non-daylight vision in a military aircraft cockpit is preferably operational at the 650 nm (or 680 nm) to 950 nm band (type A, B or C NVIS per MIL-STD-3009). The band is selected according to the display requirements, such as whether the display is colored or monochrome. This selected band also evades dim lights in the cockpit (400-650 nm) that can impair perception of the ambient nighttime light.

One device that provides such enhancement is an image intensifier ($I^2$), such as image intensifier 234, coupled with a nightlight sensor element 224. Image intensifier 234 can be of the type employing a photo-cathode for converting photon into electrons, an MCP ("Micro Cannel Plate") for multiplication of electron flux, and a phosphorous screen in which the electrons emit photons. Sensor element 224 is preferably an electronic video sensor. Sensor element 224 includes a CMOS imager that samples the screen to provide an electric signal representation of the pixel intensity. Control of the electric field strength provided by the voltage difference between the plates determines the rate of intensification. For example 100V to 1000V difference can provide for up to 30,000 fold multiplication of electron flux. Image intensifier 234 can be "gated", i.e. exposed to detection of incoming photons for limited periods. A typical exposure can be for example 60 exposures per second with 100 nsec-30 msec duration for each. A High Voltage Power Supply tube (HVPS) that encompasses a cylindrical or barrel-shaped image intensifier can provide for the voltage determining the intensification provided by the MCP and the duration of exposure in a gated intensifier. Control of the gating can provide for the protection of a night vision intensifier against damage caused by penetration of excess light into the sensitive intensifier. The control can be automated by means of a suitable light range or intensity detector. The image intensifier can also be protected by means of an optical on/off iris shutter, which may be part of router 206.

An APS for the day or night sensors is preferably compatible to a standard format such as VGA, SVGA, XGA, QXGA, UXGA; SXGA, and HDTV, to suit standard display features.

An alternative enhancement for dim light or night vision sensor can be provided by an Electron Bombarded Active Pixel Sensor (EBAPS) such as EBAPS 230. EBAPS includes technology similar to the one described above in reference to image intensifier 234, except for the electron flow which is not converted into photon radiation in a phosphorous screen, but rather forwarded directly to, for instance, a CMOS coupled therewith to provide an electric signal representation of the pixel intensity. Analogously, EBAPS is preferably gated. A High Voltage Power Supply (HVPS) can provide for the controlled powering of the EBAPS. It is noted that EBAPS occupies substantially smaller space than that consumed by a sensor coupled with an image intensifier.

In the above context, router 206 can operate on the basis of intensity (rather than frequency), splitting the incoming light beam into two or more paths. Router 206 can be implemented using a 10%-90% prism, wherein 10% of the light intensity is reflected to a daylight sensor and 90% is refracted toward a night vision sensor. An alternative adequate option is a 10%-90% pellicle, wherein 90% of the light intensity is transferred (or reflected) to a night vision sensor and 10% is reflected (or refracted) toward a daylight sensor.

Other routing methods operate on a frequency basis. Such routers can include a VIS-NIR separator, splitting between the Visual Spectrum, which is routed to the daylight sensor, and the Near Infra-Red spectrum, which is routed to the nightlight sensor. In the context of passing the 1064 nm band together with daylight to the same sensor, a notch filter for the 1064 nm frequency can be added to router 206, for limiting the NIR spectrum from reaching the daylight sensor.

A further routing method operates under the time domain. Such routers can include a switching mirror (such as of MEMS type), which alternately routes the light beam toward two or more sensors. In the above context, router 206 can be operated so that, for example, 10% of the time period the light beam is routed to the day sensor, and 90% of the time period the light beam is routed to the night sensor.

Camera 200 also includes control and processing unit 250 coupled with sensors 210, 212, and 214, and a display unit 260 coupled with control and processing unit 250. Control and processing unit 250 receives the digital pixels images provided by sensors 210, 212, and 214, and includes an image processor that merges or fuses the images in registration and provides them downstream to display module 260 or to an external display. Without control and processing unit 250, the provision of the signal information directly from the sensors 210, 212, and 214 to an external display, in a HMD or elsewhere onboard (if on a vehicle), requires heavy wiring. These images are typically pixel-based video images of the same scenery, where preferably each frame is synchronized to equivalent frames in the different sensors. Control and processing unit 250 functions as a real time combiner, that combines into a single image the images provided by sensors features 210, 212, and 214. Control and processing unit 250 preferably also controls the various elements of camera 200 such as activating a desired sensor or controlling a controllable splitter. In the context of airborne cameras, the output of cameras 100 and 200 can be recorded for after flight interrogation purposes at a memory (not shown) mounted in camera 100, or externally on a helmet, headset, goggles, or it can be forwarded to a memory elsewhere onboard.

Figure 3:
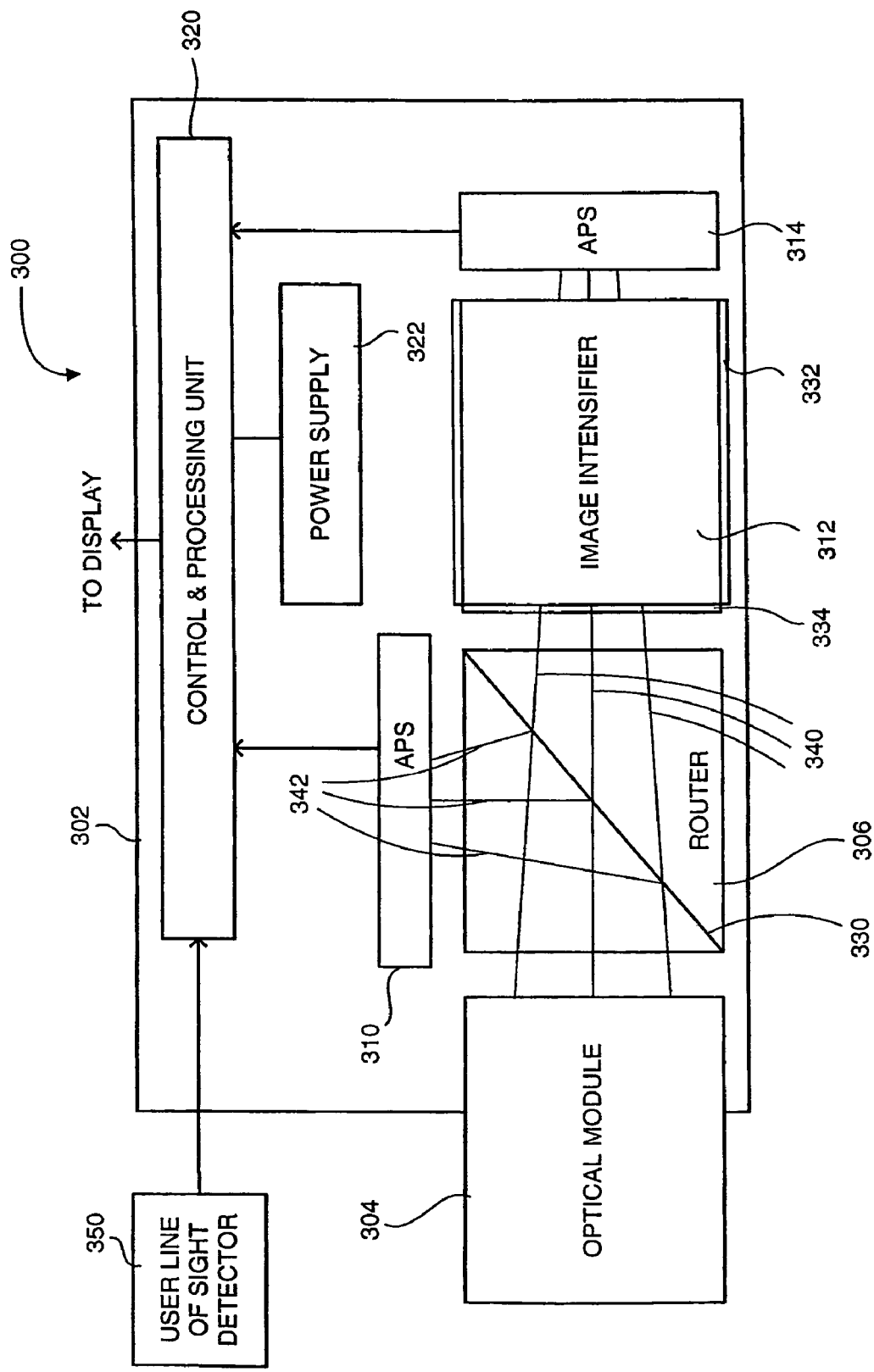
FIG. 3 is a schematic illustration of a camera constructed and operative in accordance with a further embodiment of the disclosed technique.

With reference to FIG. 3 there is shown a schematic illustration of a camera, generally referenced 300, constructed and operative in accordance with a further embodiment of the disclosed technique. Camera 300 includes a housing 302, an optical module 304, a router 306, a daylight sensor APS 310, a nightlight image intensifier 312, a nightlight sensor APS 314, a control and processing unit 320, and a power supply 322. Router 306 includes a splitter element 330 represented by a slanted prism or mirror 330, in the context of an exemplary implementation of router 306. Image intensifier 312 includes a high voltage power supply HVPS 332 and an on/off iris shutter 334. Optical module 304 directs incoming rays, represented by rays 340 to router 306. Router 306 conveys some of rays 340 toward image intensifier 312, and deflects some of rays 340 toward APS 310, as represented by rays 342. The allocation of the routed rays can be based on intensity such as with a 10%-90% prism 330 or a, bifocal optical module. The routed rays can also be allocated based on frequency differentiation, such as with a VIS-NIR separator. Yet alternatively, the rays can be routed based on time differentiation, such as with a switching mirror. A notch filter for the 1064 nm frequency or a high pass filter for wavelengths above 1 micron can be installed in router 306 for the rays directed to APS 310, which is sensitive to the 1064 nm frequency. Image intensifier 312 intensifies rays 340 for detection by APS 314. This is an I²APS configuration. On/off iris shutter 334 is disposed before intensifier 312 for controlling penetration of excess daylight into intensifier 312. HVPS tube 332 surrounds the cylindrical intensifier 312. Alternatively, HVPS tube 332 may be spatially separated from intensifier 312. The cross sectional segments of HVPS tube 332 above and below intensifier 312 are illustrated. HVPS 332 controls and supplies power for intensifier 312 and iris shutter 334. In a daylight environment, only APS 310 is functional, for both the visible range and for the 1064 nm frequency. In a nightlight environment, APS 314 is functional for the nightlight and APS 310 is functional for the 1064 nm frequency only. Thus, camera 300 functions as a 24 hour camera, with automatic seamless sensing capabilities adaptive to changing light conditions.

APS 310 and APS 314 are coupled with control and processing unit 320 via flexible printed circuitry. APS 310 and APS 314 provide the images retrieved as a signal representation to control and processing unit 320. Control and processing unit 320 merges the retrieved images in registration and processes them to provide the resultant image to a display. Control and processing unit 320 includes an interface and control card that provides the interface for receiving control information and delivering the output signal for the display. Power supply 322, preferably in the form of a power supply card, provides the power to the various elements of camera 300, directly or through control and processing unit 320. Control and processing unit 320 is coupled with user line-of-sight detector 350. Detector 350 provides real time information regarding the fairly accurate head line-of-sight or to the more precise eye line-of-sight. Accordingly, user line-of-sight detector 350 includes a head line-of-sight reader or an eye line-of-sight tracker. Spatial and temporal filtering of noise at the pixel level is subsequently conducted by optimizing the image quality to correlate by minimum noise with the readings of line-of-sight detector 350.

Figure 4:
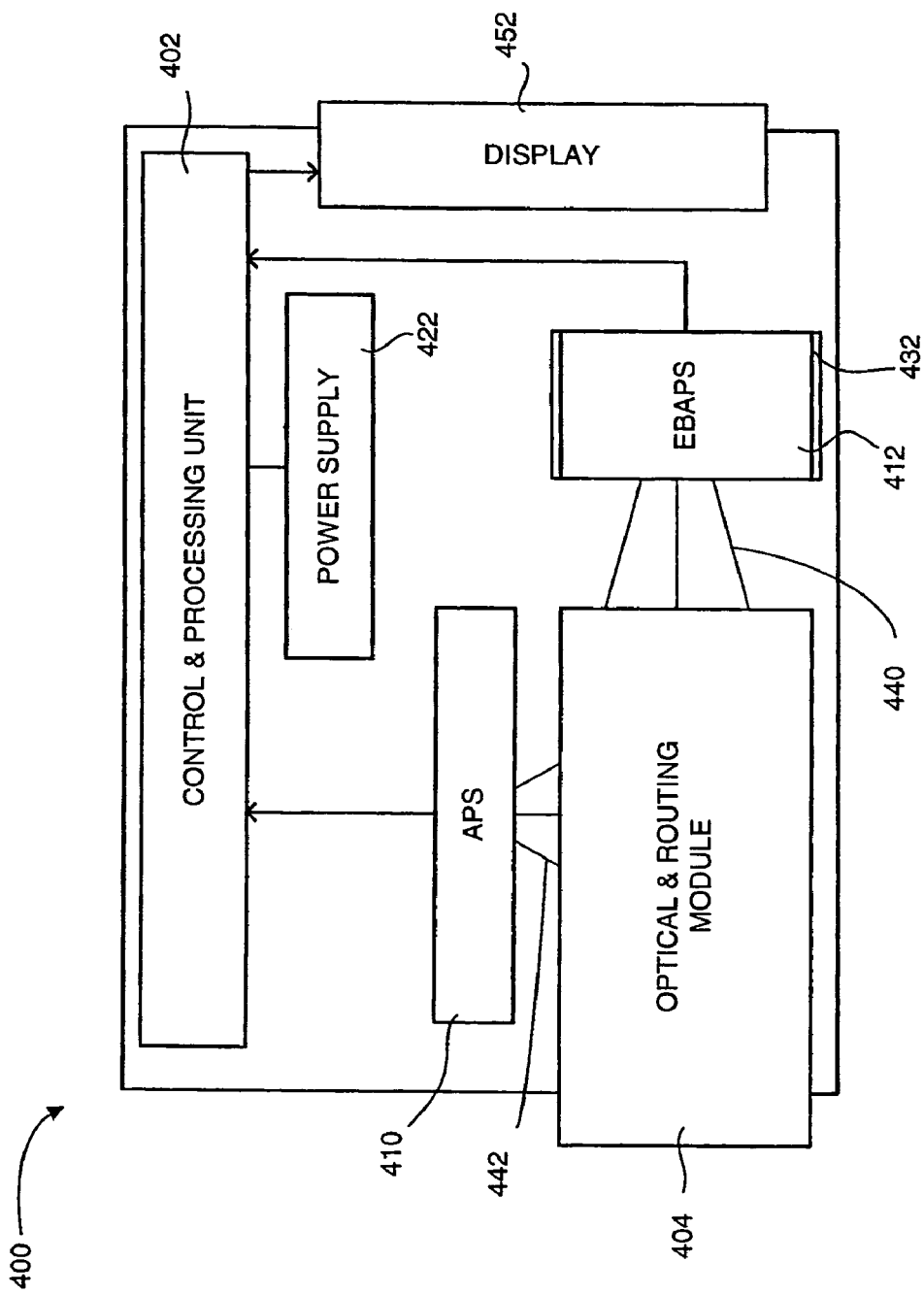
FIG. 4 is a schematic illustration of a camera constructed and operative in accordance with yet another embodiment of the disclosed technique.

Referring now to FIG. 4, there is shown a schematic illustration of a camera, generally referenced 400, constructed and operative in accordance with yet another embodiment of the disclosed technique. The embodiment shown in FIG. 4 is similar to the one shown in FIG. 3, with like parts designated by like numerals except for the use of a prefix 400 instead of 300, and their functioning is analogous and thus not elaborated. Optical and routing module 404 includes a router combined or integral with an optical module. Optical and routing module 404 functions as an equivalent to both optical module 304 and router 306 in FIG. 3. EBAPS 412 functions as an equivalent to both intensifier 312 and nightlight APS 314 (an equivalent of iris shutter 334 is redundant), and is powered by HVPS 432. Camera 400 further includes a display 452 coupled with control and processing unit 402. Control and processing unit provides its output signal to display 452, for displaying the images detected by APS 410 and EBAPS 412. In the example of a pilot, such a display can include an HMD display, such as a helmet visor, goggles or other eye piece, and the like.

Figure 5:
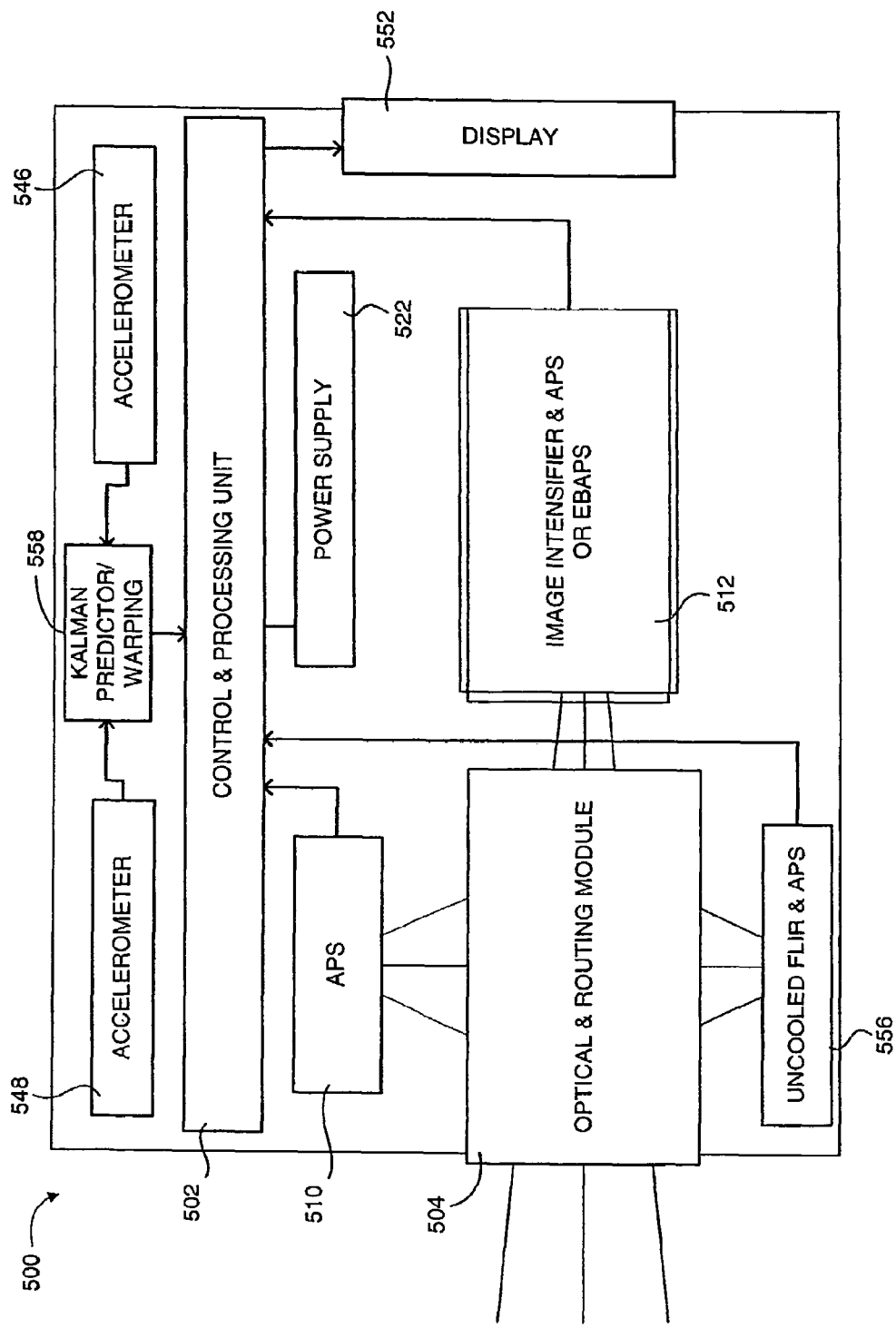
FIG. 5 is a schematic illustration of a camera constructed and operative in accordance with yet a further embodiment of the disclosed technique.

With reference to FIG. 5, there is shown a schematic illustration of a camera, generally designated 500, constructed and operative in accordance with yet a further embodiment of the disclosed technique. Camera 500 includes optical and routing module 504, coupled with three sensors: daylight sensor APS 510, nightlight sensor 512, and thermal sensor 556. Optical and routing module 504 routes incoming rays toward the three sensors, analogous to the embodiment of FIG. 2. Nightlight sensor 512 includes an image intensifier and an APS analogous to the embodiment of FIG. 3, or an EBAPS analogous to the embodiment of FIG. 4. Thermal sensor 556 includes an uncooled Focal Plane Array (FPA) and APS, analogous to the one shown in the embodiment of FIG. 2. Optical and routing module 504 routes the Short Wave Infra Red (SWIR) band toward the uncooled FPA of thermal sensor 556. Alternatively, optical and routing module 504 can be designed to support a Mid Wave Infra Red (MWIR) sensor or a Long Wave Infra Red (LWIR) sensor.

Camera 500 also includes control and processing unit 502, a power supply 522 and display 552, all of which function analogously as described with reference to FIGS. 2, 3, and 4. Camera 500 further incorporates at least two accelerometers, such as accelerometers 546 and 548, for the task of spatial image stabilization for the display, due to mechanical vibrations. Vibrations of camera 500 can be caused by any shake, tremor, quivering or trembling source, etc., that eventually destabilizes the image perceived. In most cases two or three accelerometers, preferably installed as tiny MEMS chips, suffice for carrying out the task of measuring spatial vibrations. It is noted that a gyroscope may be used instead of accelerometers 546 and 548 for the purposes of vibration measurement. Accelerometers 546 and 548 are coupled with Kalman Predictor/warping 558, which is coupled with control and processing unit 502. Accelerometers 546 and 548 detect and monitor camera vibration, and provide this information to Kalman predictor/warping 558. A Kalman predictor is employed to calculate, on a per image basis, image transformation due to camera movements, and to yield the corrective image transfer commands. The image transfer commands define the necessary geometrical transformation "warping" of the images perceived by the camera sensors (510, 512, 556). All these functions can be performed by control and processing unit 502 that incorporates the Kalman predictor function or the warping function or both. A Kalman predictor or a warping module can each form a separate module, and are shown as a single module 558 for demonstrative purposes.

Figure 6:
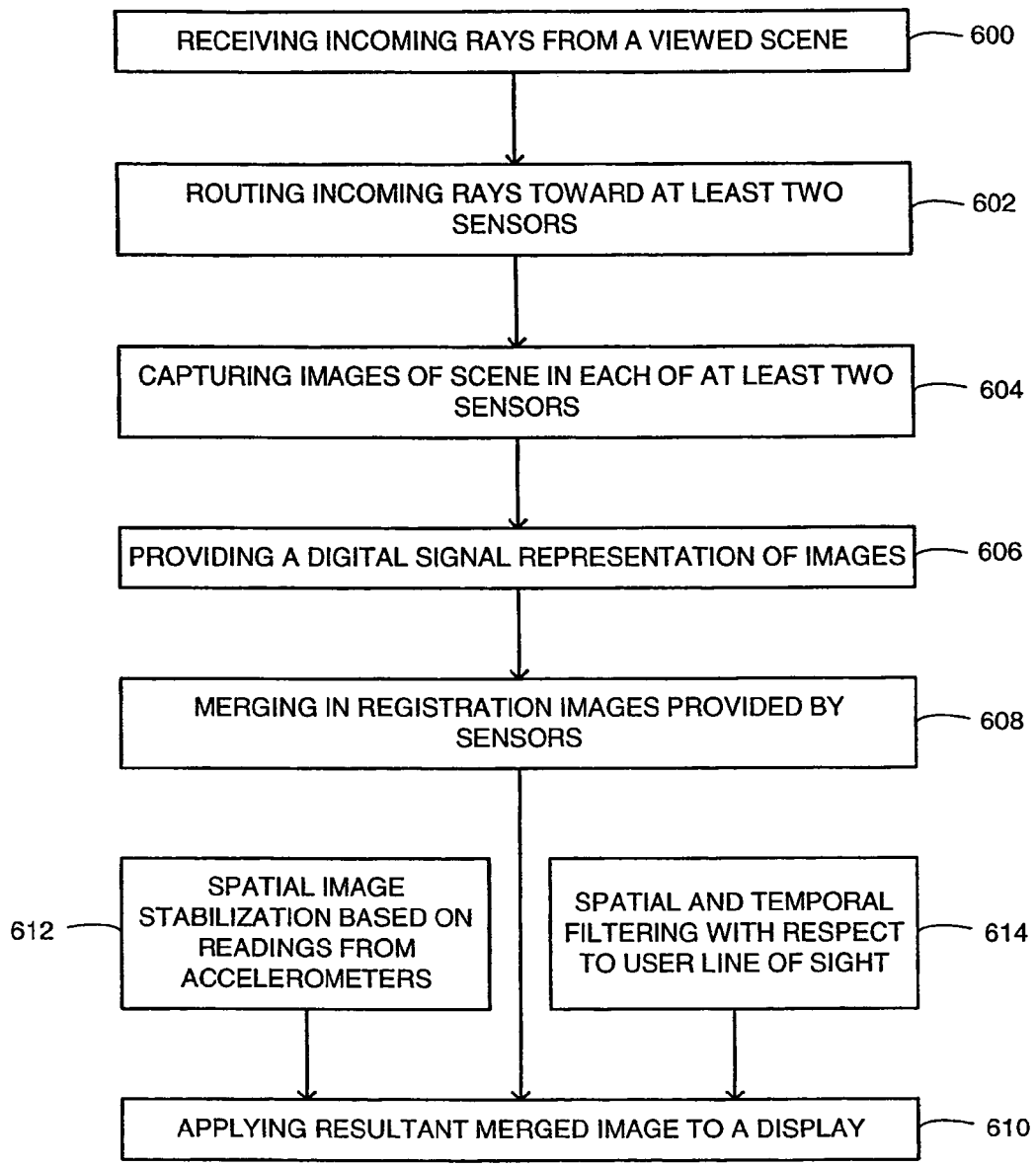
FIG. 6 is a block diagram of a method for converting a scene for a display according to another embodiment constructed and operative in accordance with the disclosed technique.

According to the disclosed technique there is also provided a method for converting a direct scene for a head mounted display. Reference is now made to FIG. 6, illustrating a method for converting a direct scene for a head mounted display according to another embodiment constructed and operative in accordance with the disclosed technique. In procedure 600, incoming rays from a viewed scene are received in an optical module. With reference to FIGS. 1 and 2, incoming rays from the direct scene are received by optical and routing module 102 or optical elements 204. In procedure 602 the incoming rays are routed toward at least two sensors. In reference to FIGS. 1 and 2, optical and routing module 102 or router 206 routes the incoming rays toward sensors 110, 112, and 114, or sensors 210, 212 and 214, respectively. It is noted that procedure 602 can also be performed simultaneously with procedure 600. In procedure 604 images of the scene are captured in each of the at least two sensors. In procedure 606, each of the at least two sensors provides a digital signal representation of the images it captures. In reference to FIG. 1, each of sensors 110, 112, and 114 capture images of the scene, and convert the images into a digital signal representation. Each sensor has a specific operational wavelength range which is adapted to the sensor capabilities. The capabilities of each sensor are selected to provide complementary image information with respect to the detected information of the other sensors. Preferably, at least one of the at least two sensors features the amplification of dim light or the conversion of invisible light to a visible representation, or a combination of such amplification and conversion. If at least one other sensor detects daylight, seamless day and night detection is provided. In reference to FIG. 3, sensor APS 310 provides for daylight detection, and sensor 314 together with image intensifier 312 ($I^2$APS configuration) provides for dim light or night vision amplification and conversion.

In optional procedure 608 the images provided by the at least two sensors are merged in registration. In reference to FIG. 2, control and processing unit 250 merges in registration the images provided by sensors 210, 212, and 214. Procedure 608 preferably includes the sub-procedure of image fusion between at least two sensors on the basis of pixel intensity, at the pixel level, for providing a dynamic range extension. Procedure 608 further preferably includes the sub-procedure of generating a synthetic colorized image on the basis of spectral response, at the pixel level, for providing multiple spectral band observation. Such sub-procedures provide for the elimination of the "blooming effect", typically occurring at nighttime in night vision systems, when illuminators (such as in urban scenery) generate bloomed light spots. An on-the-fly pixel analysis for passing threshold intensity is performed on both the daylight APS sensor and the nightlight $I^2$APS intensified sensor. The best pixel within the dynamic range, that is not saturated or cutoff, is transferred to the display for optional viewing.

In optional procedure 610 the resultant merged images are processed to be applied to a display. In reference to FIG. 2, sensors 210, 212 and 214 provide the retrieved images to control and processing unit 250, wherein the images are merged in registration and processed to provide the resultant image to display module 260.

Two optional stabilizing or corrective procedures can be applied for improving the method performance. In procedure 612, spatial image stabilization is carried out based on readings from accelerometers, for correcting vibration disturbances. In reference to FIG. 5, accelerometers 546 and 548 provide their readings to Kalman predictor/warping 558, which corrects the vibration disturbances to provide spatial image stabilization. In procedure 614, spatial and temporal filtering is performed with respect to user line-of-sight. In reference to FIG. 3, user line-of-sight detector 350 provides the relevant readings to control and processing unit 320, which carries out the spatial and temporal filtering. The spatial and temporal filter is preferably based on filtering at the pixel level with respect to the readings of a head line-of-sight reader or an eye line-of-sight tracker.

Figure 7:
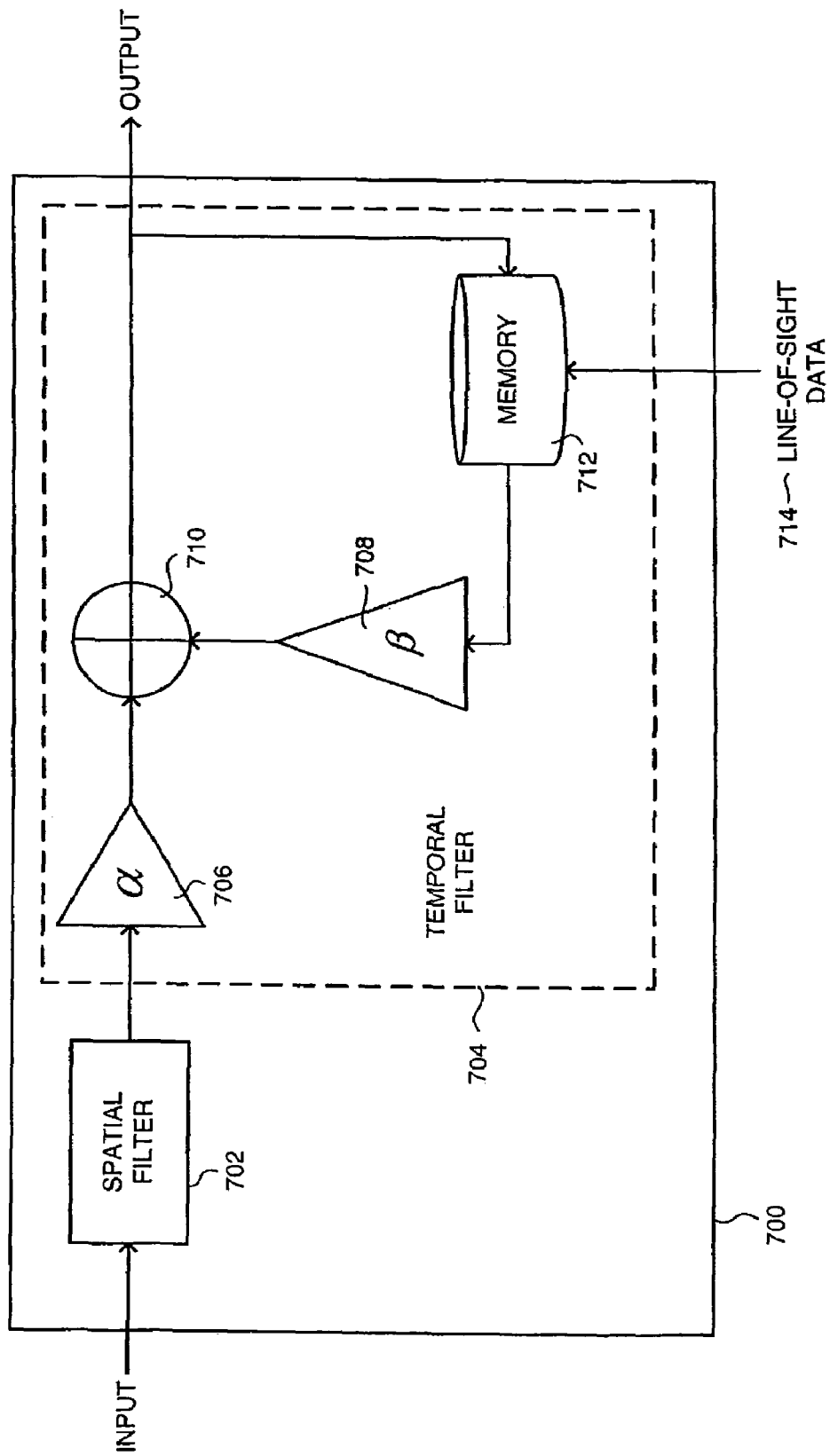
FIG. 7 is a schematic illustration of spatial and temporal filtering with respect to user line-of-sight, operative in accordance with an embodiment of the disclosed technique.
Figure 8:
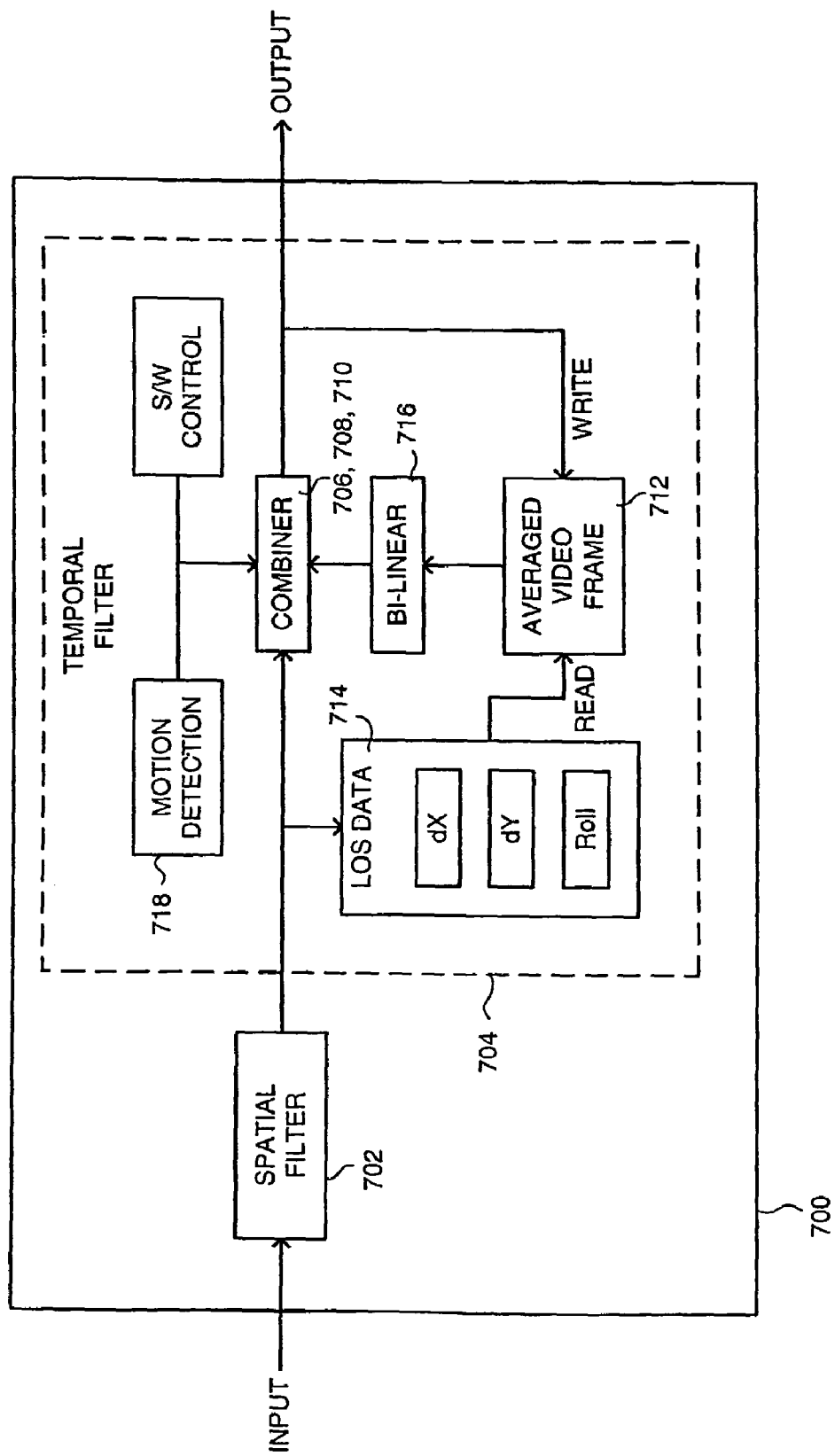
FIG. 8 is an expanded view of the schematic illustration of FIG. 7.

Reference is now made to FIGS. 7 and 8. FIG. 7 is a schematic illustration of spatial and temporal filtering with respect to user line-of-sight, operative in accordance with an embodiment of the disclosed technique. FIG. 8 is an expanded view of the schematic illustration of FIG. 7. FIGS. 7 and 8 show a spatial and temporal filter (SIT filter), generally designated 700, which serves to filter an image in the spatial and temporal domain. The filtering is performed in real-time with minimal latency and no smearing effect. S/T filter 700 consists of a spatial filter 702 and a temporal filter 704. Spatial filter 702 performs scintillation noise cleaning and is preferably implemented using the median process. Temporal filter 704 is based on an IIR (Infinite Impulse Response) filter that is low pass with one pole. Temporal filter 704 includes a memory 712, an alpha multiplier process 706, a beta multiplier process 708, and an adder process 710. Memory 712 stores the history data, which consists of averaged video frames. Processes 706, 708 and 710 constitute a combiner process. Alpha multiplier process 706 operates on the incoming video stream, beta multiplier process 708 operates on the history data, and adder process 710 combines the two pixel streams. For example, typical coefficient values may be: alpha=1/10 and beta=10/11. In this case, the filter will improve the signal to noise ratio by a factor of at least 3. The output from adder 710 serves as the filter output, which is then fed back to the history buffer in memory 712 as the new averaged video frame. The address of which of the pixels are read is matched to the current incoming pixel according to line-of-sight data 714. Line-of-sight data 714 determines the four nearest neighboring pixels of the current incoming pixel position. A bilinear process 716 is performed to calculate the equivalent pixel level to the four nearest neighboring pixels. Temporal filter 704 further includes a motion detection process 718 that monitors the energy under the image with respect to the previous frame. This calculation is performed by analyzing the image over several segments in parallel. The results are then used to determine the alpha coefficient for alpha multiplier process 706 and the beta coefficient for beta multiplier process 708.

It will be appreciated by persons skilled in the art that the disclosed technique is not limited to what has been particularly shown and described hereinabove. Rather the scope of the disclosed technique is defined only by the claims, which follow.

The invention claimed is:

1. Versatile camera for various visibility conditions, comprising:
    at least two sensors for capturing images of a scene and providing a digital signal representation of said images;
    an optical and routing module for receiving incoming rays from said scene and routing said incoming rays toward said at least two sensors, respectively; and
    a processor for merging in registration and processing the images provided by said at least two sensors,
    wherein at least one of said at least two sensors comprises a good visibility conditions sensor having low sensitivity and high resolution in a first wavelength range;
    wherein at least another of said at least two sensors comprises a poor visibility conditions sensor having high sensitivity and low resolution in a second wavelength range at least partially overlapping said first wavelength range; and
    wherein said optical and routing module directs, for the partially overlapping portion of said first wavelength range and said second wavelength range a small-portion of the light intensity of said incoming rays toward said good visibility conditions sensor, said optical and routing module further directing a large-portion of the light intensity of said incoming rays toward said poor visibility conditions sensor, and for the non-overlapping portion of said second wavelength range, said optical and routing module directs said incoming rays toward said poor visibility conditions sensor.

2. The versatile camera according to claim 1, wherein said poor visibility conditions sensor comprises a dim light amplifier.

3. The versatile camera according to claim 2, further comprising a High Voltage Power Supply (HVPS) for said dim light amplifier.

4. The versatile camera according to claim 1, wherein said poor visibility conditions sensor comprises an invisible light sensor for detecting and converting invisible light to a visible representation.

5. The versatile camera according to claim 1, further comprising at least two accelerometers for spatial stabilization of said display.

6. The versatile camera according to claim 1, further comprising at least one gyroscope for spatial stabilization of said display.

7. The versatile camera according to claim 1, further comprising a user line-of-sight detector, for spatial and temporal filtering.

8. The versatile camera according to claim 7, wherein said user line-of-sight detector comprises a head line-of-sight reader for spatial and temporal filtering at the pixel level with reference to the readings of said head line-of-sight reader.

9. The versatile camera according to claim 7, wherein said user line-of-sight detector comprises an eye line-of-sight tracker for spatial and temporal filtering at the pixel level with reference to the readings of said eye line-of-sight tracker.

10. The versatile camera according to claim 1, wherein said at least two sensors include any combination from the list consisting of:
    a visible daylight sensor;
    a night vision enhancement sensor;
    a dim light enhancement sensor;
    a 1.06 micron sensor; and
    a Forward looking infra-red (FLIR) sensor.

11. The versatile camera according to claim 10, wherein said FLIR sensor may include any combination from the list consisting of:
    an Indium Gallium Arsenide (InGaA) sensor;
    an Indium Stibnite (InSb) sensor;
    a non-refrigerated Vanadium Oxide (VOx) bolometer;
    a Gallium Arsenide (GaA) sensor; and
    a Quantum Well Infrared Photodetector (QWIP).

12. The versatile camera according to claim 1, wherein said good visibility conditions sensor comprises an Active Pixel Sensor (APS) operational for the visible band from about 400-450 nm to about 650-680 nm.

13. The versatile camera according to claim 1, wherein one sensor of said at least two sensors comprises an Active Pixel Sensor (APS) operational at wavelengths above 950 nm (high pass IR).

14. The versatile camera according to claim 1, wherein one sensor of said at least two sensors comprises an Active Pixel Sensor (APS) operational at the 1064 nm IR frequency.

15. The versatile camera according to claim 1, wherein said good visibility conditions sensor comprises an Active Pixel Sensor (APS) operational at visible daylight and at ranges extending beyond the visible daylight, and wherein said Active Pixel Sensor (APS) comprises a sensor selected from the list consisting of:
    a sensor at 1064 nm IR frequency;
    a high pass IR sensor above the wavelength of 950 nm; and
    a broadband sensor substantially operational from about 400 nm to about 1100 nm.

16. The versatile camera according to claim 1, wherein at least one of said at least two sensors comprises an image intensifier (I2) coupled to an electronic video sensor.

17. The versatile camera according to claim 16, wherein said image intensifier ($I^2$) comprises an optical on/off iris shutter.

18. The versatile camera according to claim 16, wherein said image intensifier ($I^2$) is gated.

19. The versatile camera according to claim 1, wherein said poor visibility conditions sensor comprises an image intensifier ($I^2$) coupled to an electronic video sensor, which is operational for the about 650-680nm to about 950nm wavelength band.

20. The versatile camera according to claim 1, wherein at least one of said at least two sensors comprises an Electron Bombardment Active Pixel Sensor (EBAPS).

21. The versatile camera according to claim 20, wherein said EBAPS is gated.

22. The versatile camera according to claim 1, wherein at least one of said at least two sensors comprises an Active Pixel Sensor (APS) compatible to a standard format selected from the list consisting of:
    VGA;
    SVGA;
    XGA;
    QXGA;
    UXGA;
    SXGA; and
    HDTV.

23. The versatile camera according to claim 1, wherein said optical and routing module further comprises a router selected from the list consisting of:
    slanted semitransparent partially reflecting mirror;
    prism;
    pellicle;
    spectral splitter;
    lenses;
    diffractive element;
    micro machining (mechanically deflecting plates —MEMS/MOEMS);
    bifocal optics; and
    multiple path optics.

24. The versatile camera according to claim 1, wherein said small-portion/large-portion splitter is selected from the list consisting of:
    10%-90% prism, wherein 10% of the light intensity is directed toward said good visibility conditions sensor and 90% of the light intensity is directed toward said poor visibility conditions sensor; and
    10%-90% pellicle, wherein 90% of the light intensity is directed toward said poor visibility conditions sensor and 10% of the light intensity is directed toward said good visibility conditions sensor.

25. The versatile camera according to claim 23, wherein said spectral splitter is a VIS-NIR separator.

26. The versatile camera according to claim 1, wherein said optical and routing module includes a notch filter for the 1064nm frequency.

27. The versatile camera according to claim 1, wherein said versatile camera is coupled with a display for displaying said scene.

28. The versatile camera according to claim 27, wherein said display comprises a head mounted display.

29. The versatile camera according to claim 28, wherein said head mounted display is selected from the list consisting of:
    helmet mounted display;
    headset mounted display;
    goggles;
    eyepiece;
    binocular display; and
    monocle.

30. The versatile camera according to claim 1, wherein said versatile camera is operative to apply display(s) to both eyes of the user, and wherein said digital signal representation of said images is divided for its separate application to each eye.

31. The versatile camera according to claim 1, wherein said versatile camera is operative to apply a display to a single eye of the user.

32. The versatile camera according to claim 1, wherein a second similar versatile camera is operative to apply a display to the other eye of the user.

33. The versatile camera according to claim 1, mounted on, integral with, added on, or attachable to a device selected from the list consisting of:
   helmet;
   headset;
   goggles;
   eyepiece;
   binoculars; and
   monocle.

34. The versatile camera according to claim 1, adapted for use in an air, space, sea, or land environment, for a direct or indirect scene, onboard a vehicle or for portable use by an individual.

35. The versatile camera according to claim 1, wherein said scene is a direct scene, and said digital signal representation of said images is compatible to display in registration with said direct scene as seen by the user.

36. A method for providing images of a scene under various visibility conditions for a display, comprising the procedures of:
   receiving incoming rays from said scene;
   routing said incoming rays toward at least two sensors;
   capturing images of said scene in each of said at least two sensors;
   providing a digital signal representation of said images; and
   merging in registration the images provided by said at least two sensors,
   wherein at least one of said at least two sensors comprises a good visibility conditions sensor having low sensitivity and high resolution in a first wavelength range;
   wherein at least another of said at least two sensors comprises a poor visibility conditions sensor having high sensitivity and low resolution in a second wavelength range at least partially overlapping said first wavelength range; and
   wherein for the partially overlapping portion of said first wavelength range and said second wavelength range, a small-portion of the light intensity of said incoming rays is directed toward said good visibility conditions sensor, and a large-portion of the light intensity of said incoming rays is directed toward said poor visibility conditions sensor, and for the non-overlapping portion of said second wavelength range, said incoming rays are directed toward said poor visibility conditions sensor.

37. The method for providing images according to claim 36, wherein said procedure of providing a digital signal representation of said images includes any combination of procedures selected from the list consisting of:
   amplifying dim light; and
   converting invisible light to a visible representation,
   wherein said procedure is performed in at least one of said at least two sensors.

38. The method for providing images according to claim 36, wherein said procedure of merging comprises the sub-procedure of image fusion between at least two sensors on the basis of pixel intensity, at the pixel level.

39. The method for providing images according to claim 36, wherein said procedure of merging further comprises the sub-procedure of generating a synthetic colorized image, on the basis of spectral response, at the pixel level.

40. The method for providing images according to claim 36, further comprising the procedure of applying the resultant merged image to a display.

41. The method for providing images according to claim 36, further comprising the procedure of spatial image stabilization based on the reading of at least two accelerometers.

42. The method for providing images according to claim 36, further comprising the procedure of spatial image stabilization based on the reading of at least one gyroscope.

43. The method for providing images according to claim 36, further comprising the procedure of spatial and temporal filtering with respect to the user line-of-sight.

44. The method for providing images according to claim 43, wherein said procedure of spatial and temporal filtering comprises spatial and temporal filtering at the pixel level with respect to the readings of a head line-of-sight reader or an eye line of sight tracker.

* * * * *

UNITED STATES PATENT AND TRADEMARK OFFICE
CERTIFICATE OF CORRECTION

PATENT NO. : 7,496,293 B2  
APPLICATION NO. : 11/182302  
DATED : February 24, 2009  
INVENTOR(S) : Hanan Shamir et al.

It is certified that error appears in the above-identified patent and that said Letters Patent is hereby corrected as shown below:

Col. 14 line 8 in claim 20, replace "Bombardment" with the word "Bombarded"

Col. 15 line 6 in claim 32, replace "claim 1" with "claim 31"

Signed and Sealed this

Twenty-first Day of April, 2009

JOHN DOLL  
*Acting Director of the United States Patent and Trademark Office*